United States Patent [19]

Kuraishi

[11] 4,258,991
[45] Mar. 31, 1981

[54] ELECTRONIC FLASH APPARATUS FOR A CAMERA

[75] Inventor: Kaoru Kuraishi, Tokyo, Japan

[73] Assignee: Toshiba Photo Products Co., Ltd., Tokyo, Japan

[21] Appl. No.: 46,454

[22] Filed: Jun. 7, 1979

[30] Foreign Application Priority Data

Feb. 9, 1979 [JP] Japan .................................. 54-13914
Feb. 9, 1979 [JP] Japan .................................. 54-13915
Feb. 9, 1979 [JP] Japan .......................... 54-15551[U]

[51] Int. Cl.³ ............................................ G03B 17/18
[52] U.S. Cl. ................................. 354/32; 315/133; 354/128
[58] Field of Search ............... 315/132, 133, 135, 136; 354/53, 60 L, 127, 128, 289, 32, 33, 34

[56] References Cited

FOREIGN PATENT DOCUMENTS 2441089 3/1976 Fed. Rep. of Germany .......... 315/133

Primary Examiner—Michael L. Gellner
Attorney, Agent, or Firm—Darby & Darby

[57] ABSTRACT

An electronic flash apparatus for a camera is provided with a main discharge capacitor, a charging means for charging the capacitor, a flash discharge tube which radiates light through the discharge of a charge stored in the capacitor, and a display section for displaying an exposure condition at the time of photograph. The display section includes a display portion for displaying an F-number corresponding to a film sensitivity, a portion for displaying a plurality of photographable distances corresponding to a charged voltage across the capacitor and the F-number and a charged voltage discriminating circuit having a plurality of light emission elements for successively and stepwisely emitting light as the charged voltage across the capacitor increases.

20 Claims, 17 Drawing Figures

F I G. 1
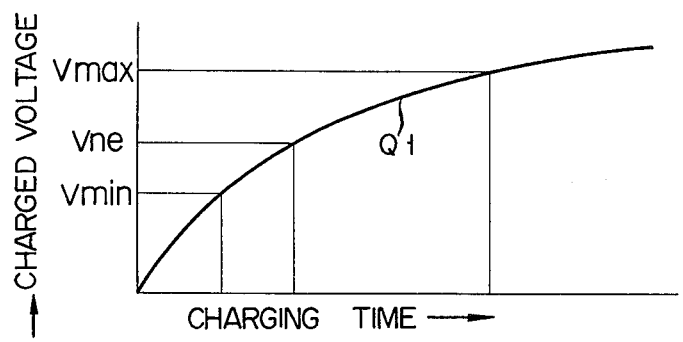
F I G. 2
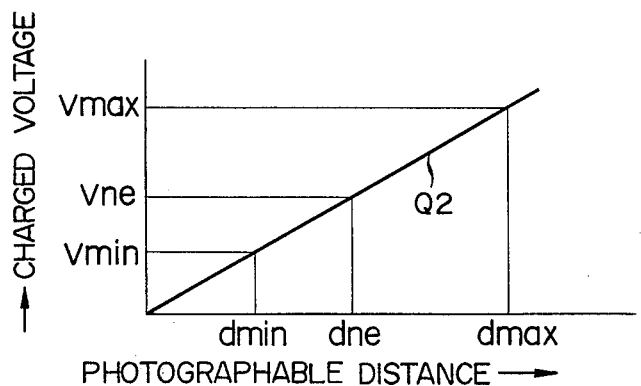

FIG. 5
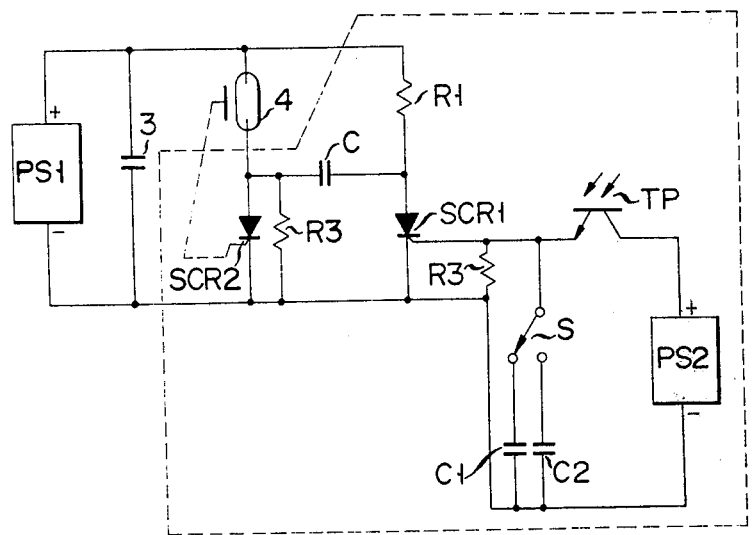
FIG. 6
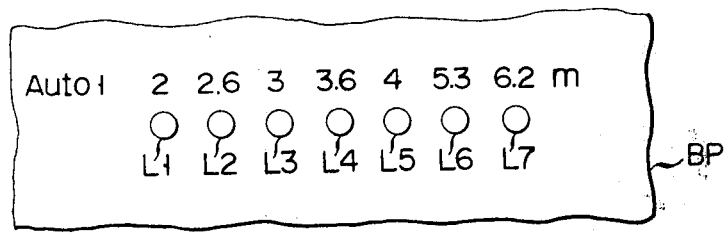
FIG. 7A
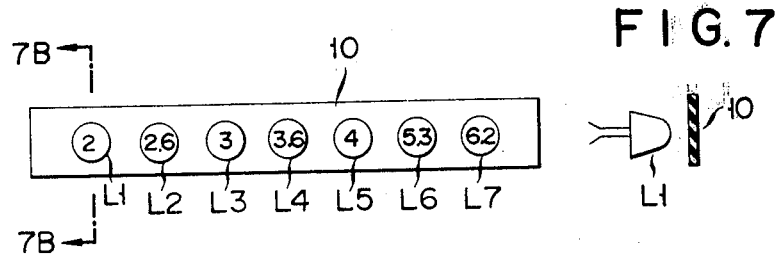
FIG. 7B

F I G. 11B
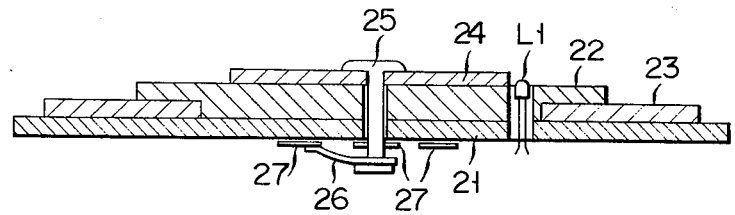
F I G. 12
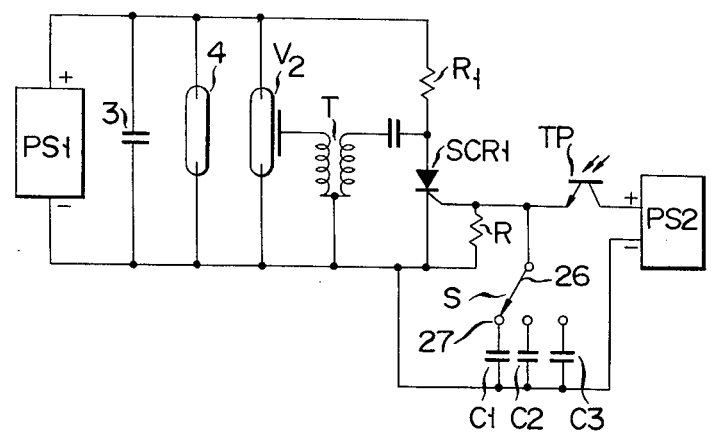

F I G. 13
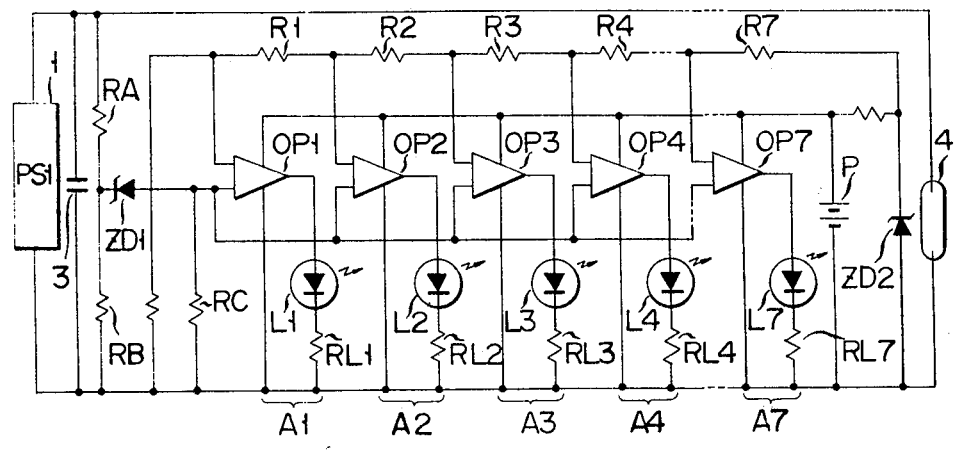
F I G. 14
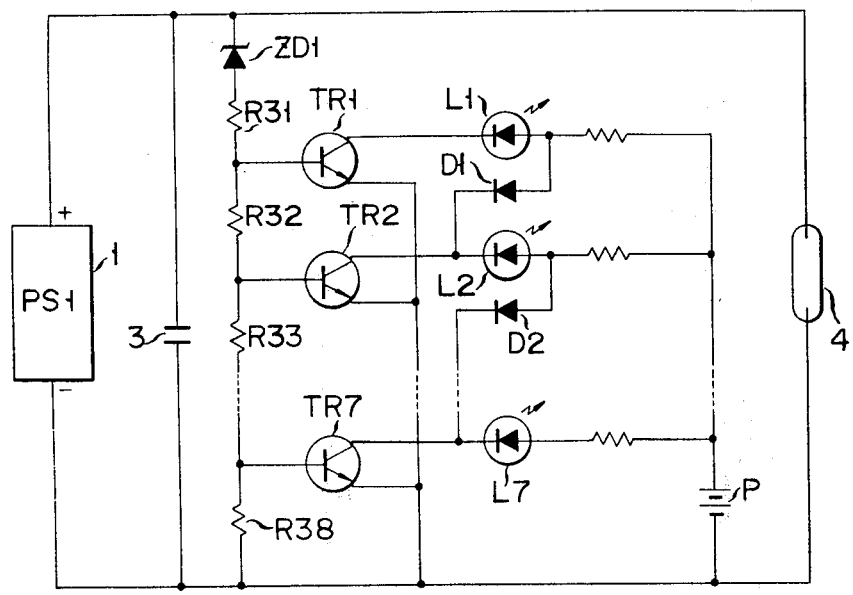

ELECTRONIC FLASH APPARATUS FOR A CAMERA

The invention relates to an electronic flash apparatus for a camera to enable the camera always to photograph under a proper exposure condition.

An electronic flash apparatus used when a photograph is taken with an instantaneous exposure causes a capacitor to charge to a given value of voltage and to discharge the stored charge in the capacitor through a pair of main electrodes of a discharge tube, for example, a xenon tube, to make it flash. The charge and discharge operations must be repeated for each photographing operation.

An electronic flash apparatus having an automatic light-amount control enables one to take a picture in a manner that, with a fixed F-number (aperture size of an iris diaphram of the taking lens), the light intensity of the light reflected at an object to be photographed is detected and the amount of light from the discharge tube is controlled in accordance with the detected light intensity so as to provide a proper exposure.

In the latter type apparatus, the furthermost distance allowing a normal photograph to be taken is indicated by a guide number corresponding to when the discharge tube emits the maximum amount of flashlight. The guide number is expressed by the product of an F-number and the distance giving a proper exposure. Therefore, a normal photograph of the object located at the furthermost photographable distance is ensured only when the discharge tube radiates an exact maximum amount of flash-light. In other words, an insufficient amount of flash-light radiated shortens the photographable distance.

An apparatus of the automatic light-amount control type will generally be used. The apparatus is generally provided with a neon lamp which lights up at a predetermined charged voltage Vne across a main discharge capacitor. The voltage Vne is lower than the maximum possible charged voltage. The neon lamp, when it lights, indicates that the charging into the capacitor is completed. Therefore, if the camera operator releases the shutter immediately after the neon lamp is energized, for photographing the object at the furthermost photographable distance, the object is photographed with insufficient exposure for the reason that the capacitor is not charged to the maximum voltage. When the object is located at a position nearer than that required to permit the neon lamp to light, the amount of flashlight emitted from the discharge tube is larger than that necessary for taking a photograph of such an object. Nevertheless, an operator using the conventional apparatus of this type, when taking a picture, must wait until the charged voltage reaches the neon lamp drive voltage Vne.

To avoid the above-mentioned disadvantage, the present invention proposes a new flash apparatus with a plurality of light-emission elements corresponding to various photographable distances. These light-emission elements are so arranged as to emit light in response to given corresponding voltage levels of the rising charged voltage across the capacitor. A corresponding photographable distance is indicated for each light-emission element. In operation, the apparatus snaps a lightflash immediately after a light emission element is energized to emit light. In photographing, the F-number is generally properly changed in compliance with the object or scenery condition. Accordingly, even if the F-number is fixed as in the automatic light-amount control type of flash apparatus, it is preferred that the F-number should be visually marked corresponding to the light-emission elements and photographable distances. The provision of such an F-number in an indication or display section of exposure conditions, substantially eliminates an erronous picture-taking operation by a camera user, which otherwise would be made frequently.

Accordingly, an object of the invention is to provide an electronic flash apparatus for use in a camera which is provided with an exposure-condition-displaying section including an F-number display portion and a proper photographable distance display portion responsive to a charged voltage of a main discharge capacitor.

In brief, the invention may be summarized as an electronic flash apparatus for a camera involving a main discharge capacitor, means for charging the main discharge capacitor, a flash discharge tube which is connected in parallel with the main discharge capacitor and is made to radiate light through the discharge of a charge stored in the main discharge capacitor, and a display means for displaying exposure conditions. The exposure condition displaying means comprises a display portion for displaying an F-number corresponding to a film sensitivity; a portion for displaying a plurality of photographable distances corresponding to the F-number and the charged voltage across the capacitor; and charged voltage discriminating means which are provided corresponding to the repective photographable distances within a range including at least a part of the photographable distance display portion and including a plurality of light emission elements which are stepwisely energized as the charged voltage across the capacitor increases.

This invention can be more fully understood from the following detailed description when taken in conjunction with the accompanying drawings, in which:

FIG. 1 shows a graph illustrating a variation of charged voltage across a main discharge capacitor with respect to charging time;

FIG. 2 shows a graph illustrating a variation of the photographable distance with respect to the charged voltage of a main discharge capacitor;

FIG. 5 shows a circuit diagram of another light amount control device adaptable to the circuit in FIG. 3;

FIG. 6 illustrates a first embodiment of an exposure condition displaying section of an electronic flash apparatus according to the invention;

FIGS. 7A and 7B illustrate a second embodiment of an exposure condition displaying section of an electronic flash apparatus according to the invention;

Figure 11A:
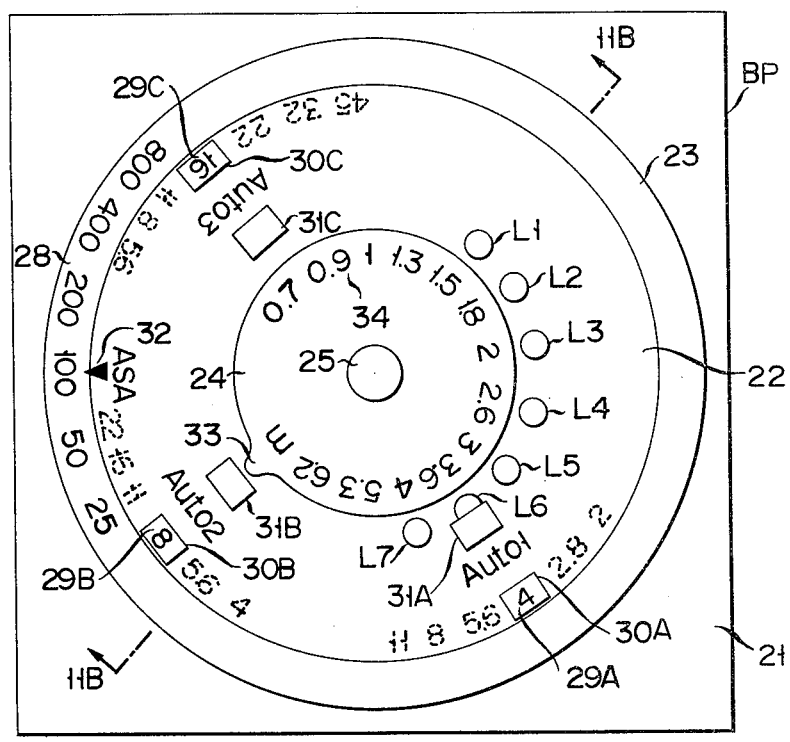

FIGS. 11A and 11B cooperate to illustrate a sixth embodiment of an exposure condition displaying section of an electronic flash apparatus accoding to the invention;

FIG. 12 shows a circuit diagram of an example of a light amount control device adaptable to FIGS. 11A and 11B;

FIGS. 13 and 14 show other embodiments of the electronic flash apparatus according to the invention.

Before proceeding with describing an embodiment of an electronic flash apparatus for a camera, some defects of the conventional apparatus will be described with reference to FIGS. 1 and 2. A relationship between charged voltage and charging time of a main discharge capacitor is plotted by a curve Q1 in FIG. 1. In the conventional apparatus, a charging indicator lamp is lit at the charged voltage Vne. A relationship between the charged voltage across the main discharge capacitor and photographable distances is plotted by a line Q2 in FIG. 2. Accordingly, if a shutter of a camera is released immediately after the charge indicator lamp is lit at the charged voltage Vne, the camera will photograph an object at a position beyond a distance $d_{ne}$ with insufficient exposure. In other words, even when an object placed at a distance $d_{min}$ is photographed, a camera user must wait until the charged voltage across the capacitor reaches the Vne because only then is the indicator lamp lit.

Figure 3:
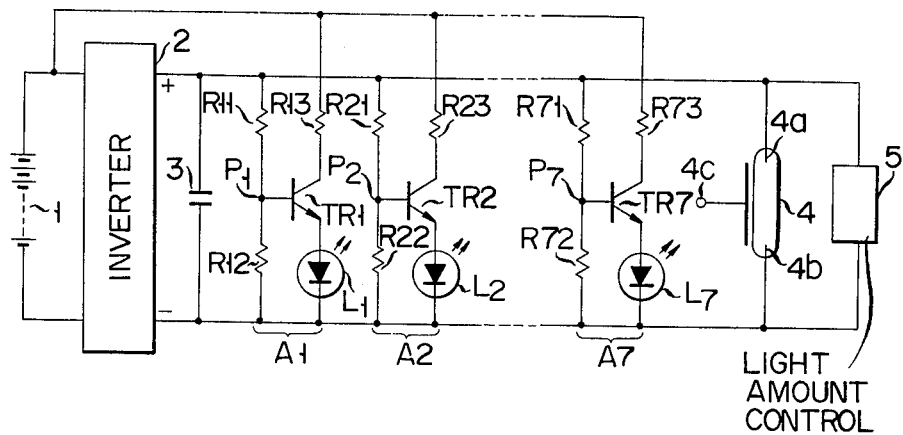
FIG. 3 shows a circuit diagram of an embodiment of an electronic flash apparatus for a camera according to the invention.

Reference is made to FIG. 3 illustrating an embodiment of an electronic flash apparatus for a camera according to the invention. In the figure, an output from a power source 1, for example, a battery, of a low voltage is applied to the input terminal of a booster inverter 2 of which the output is applied across a main discharge capacitor 3. The power source 1 and the inverter 2 cooperate to constitute a charging unit (also referred to as a first power source in the specification). Main electrodes 4a and 4b of a flash discharge tube 4, for example, a xenon discharge tube, are coupled with the terminals of the capacitor 3. When a trigger pulse is applied to a trigger electrode 4c of the discharge tube 4, a stored charge in the capacitor 3 is discharged through the discharge tube 4 to cause the discharge tube to flash. The trigger pulse is produced from a trigger circuit (not shown) when a synchronous contact interlocking with a camera shutter is closed. Upon the application of the trigger pulse to the trigger electrode 4c, the gas within the discharge tube 4 is ionized to decrease the impedance between the main electrodes, with the result that the capacitor 3 is discharged to cause the discharge tube 4 to flash. An automatic light amount control device (also referred to as a light amount control circuit) 5 to subsequently be described is coupled between the terminals of the discharge tube 4. The automatic light amount control device 5 detects the intensity of the light reflected at an object to be photographed which is illuminated by the flash, to control the amount of the flash light from the discharge tube 4 on the basis of the reflected light intensity detected.

A plurality of unit discriminating circuits A1 to A7 for stepwisely discriminating charged voltages across the capacitor 3 are each coupled in parallel with the charging unit. The charged voltage across the capacitor 3 rises in accordance with a given time constant and is stepwisely detected by the respective unit discriminating circuits A1 to A7. Those unit discriminating circuits A1 to A7 are the same in circuit construction. Therefore, only the circuit A1 will be described as a typical example. The circuit A1 is comprised of a voltage dividing circuit including resistors R11 and R12 connected between both ends of the capacitor 3. A transistor TR1 has its collector connected to the positive side of the power source 1 through a resistor R13 for current restriction its emitter being connected to the negative output terminal of the inverter 2 through a light emission element L1, and its base electrode being connected to the voltage dividing point P1 of the voltage divider. As the charged voltage across the capacitor 3 reaches a first given value, the potential at the voltage dividing point P1 also reaches a given voltage at which the transistor TR1 is conductive to energize the light emission element L1 for light emission. The light emission element indicates that the voltage across the capacitor 3 has reached a first predetermined value. If the voltage dividing ratios of the respective voltage dividers are so selected that the potentials at the voltage dividing points P1 to P7 of the unit discriminating circuits A1 to A7 vary in small steps with respect to a fixed voltage across the capacitor 3, the light emission elements such as light emission diodes L1 to L7 emit light at different times as the charged voltage across the capacitor 3 rises. The charged voltage across the capacitor 3 is stepwisely discriminated by the lighting of the repective light emission elements L1 to L7.

Figure 4:
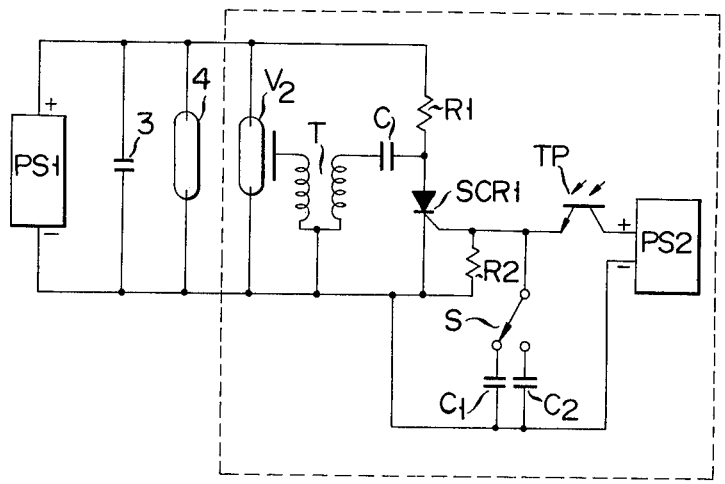
FIG. 4 shows a circuit diagram of an example of a light amount control device adaptable to the circuit in FIG. 3.

Turning now to FIG. 4, there is shown enclosed by a dotted line an example of the automatic light amount controller 5 which may be used in the flash apparatus shown in FIG. 3. In FIG. 4, PS1 designates the charging apparatus or the first power source including the power source 1 and the inverter 2, as shown in FIG. 3, and PS2 a second power source for driving the automatic light amount controller. In FIG. 4, a light amount control element V2 and a series circuit including a resistor R1 and a silicon control rectifier SCR1 are each connected in parallel with the discharge tube 4. The primary winding of the trigger transformer T is connected through the capacitor C between the anode of the SCR1 and the negative side of the power source PS1 while the secondary winding of the trigger transformer T is connected between the negative side of the power source PS1 and the trigger electrode of the light amount controller V2. The positive side of the second power source PS2 is connected to the cathode of the SCR1, through a phototransistor TP and a resistor R2. The resistor R2 is connected at one end to the cathode of the SCR1 and at the other end to the gate of the same. Integrating capacitors C1 and C2 are each connected in parallel with the resistor R2, through a switch S. As shown, the movable contacts of the switch S are connected to one end of each of the integrating capacitors C1 and C2 and the fixed contact of the same is connected to the emitter of the phototransistor TP, one end of the resistor R2 and the gate of the SCR1. The capacitances of the capacitors C1 and C2 are selected corresponding to given F-numbers. The movable contact of the switch S moves in response to the setting of a desired F-number to come in contact with the fixed contact connecting to the corresponding capacitor. If an additional F-number is desired to be set, a corresponding integration capacitor C3 (not shown) may be added to the capacitors C1 and C2.

Assume now that the F-number is set to a first value and that, in response to the setting of the F-number, the movable contact of the switch S comes in contact with the fixed contact of the integration capacitor C1. Under this condition, when the discharge tube 4 is driven to flash, the reflected light from the object is received by the phototransistor TP. Since the conductivity of the phototransistor TP changes in accordance with the amount of light received, the degree of integratiion by the capacitor C1 depends on the received light amount. Therefore, the firing instant of the SCR1 is controlled by the amount of light received by the phototransistor TP. The internal impedance of the light amount control element V2 is sufficiently lower than that of the discharge tube 4 to come into conduction in response to the firing timing of the SCR1 so that the light amount of the discharge tube 4 is controlled in accordance with the F-number set.

FIG. 5 shows a circuit diagram of another embodiment of the automatic light amount controller. A major feature of this circuit resides in the connection of a series circuit including the discharge tube 4 and a SCR2 in parallel with the main discharge capacitor 3. In this circuit, when the shutter is released, a trigger pulse is applied to the trigger electrode of the discharge tube 4 and the gate of the SCR2 at the same time. While the discharge tube 4 is discharged, if the SCR1 is turned on, the SCR2 is turned off. Therefore, the amount of light emitted from the discharge tube 4 is controlled in accordance with the amount of the light received by the phototransistor TP.

Turning now to FIG. 6, there is shown a first embodiment of an exposure condition display section. As shown, light emission elements L1 to L7 described with respect to to FIG. 3 are arranged on a substrate BP of the displaying section, with given intervals. The photographable distance values, for example, 2, 2.6, 3, 3.6, 4, 5.3 and 6.2 (m) are marked in association with the corresponding light emission elements L1 to L7, respectively. Symbol "Auto 1" on the substrate BP indicates that the F-number and the automatic light amount controller 5 should be set to "8". "Auto 1" and F-number "8" are equivalent in this case and denote an F-number for a specified film sensitivity. If the controller 5 is not used, "8" is marked in place of "Auto 1".

In the flash apparatus with the exposure condition displaying section shown in FIG. 6, when the power source 1 is turned on by a power switch (not shown), the charging into the capacitor starts. With progression of charging, the charged voltage across the capacitor 3 reaches the first given voltage. At this instance, the light emission element L1 is turned on to indicate that, within 2 m, it is possible to take a picture under a proper exposure. With further progression of charging, the light emission elements L2 to L7 are successively energized to emit light each time that the charged voltage reaches the corresponding given charged voltage of 2nd to 7th level. With such a circuit connection, therefore, the distance indicated at the time that a light emission element is energized, is approximately the exact photographable distance. Therefore, by merely releasing the shutter upon lighting of the light emission element associated with the photographable distance corresponding to the distance from the camera to the object, a camera operator can take a picture with a proper distance. Additionally, when using the flash apparatus according to the invention, the camera operator can check that the flash apparatus is ready for emitting the maximum amount of light, by seeing the lighting of the element L7. Unlike the conventional flash apparatus, the object at the furthermost photographable distance may be photographed under a proper exposure even if the shutter is released immediately after the charge indication lamp is energized. An additional advantage of the apparatus according to the invention is that the flash apparatus is independent of reduction of the electromotive force of the power source 1. In the case of the conventional apparatus of the single indication lamp type, when the charged voltage fails to reach the indication lamp drive voltage, it can not check whether the voltage is insufficient. It is for this reason that, when the object at the furthermost photographable distance is photographed on the basis of the result of a distance calculation by using the guide number, the photograph taken may have insufficient exposure. In such a case, however, the flash apparatus according to the invention does not light the light emission element associated with the furthermost distance, thereby preventing photographing with insufficient exposure. When observing a change in the intervals between adjacent successive lightings of the light emission or charged voltage indication elements L1 to L7, the camera operator can see a deterioration of the battery 1. That is to say, the flash apparatus according to the invention has a function by which battery deterioration may be checked. Furthermore, when the shutter is released to discharge the discharge tube at the time that a desired photographable distance is indicated by the corresponding charge voltage indicator, the capacitor is not charged to a maximum with the result that electrical energy required for further charging it is saved, thereby to elongate the life time of the battery.

Reference is made to FIGS. 7A and 7B illustrating a second embodiment of the exposure condition displaying section used in the flash apparatus according to the invention. As shown, a transparent board 10 is disposed above a series of light emission elements L1 to L7 and numerals representing photographable distances are marked on circled portions of the transparent board 10 right above the respective elements L1 to L7. With this construction, when a light emission element is energized to illuminate the corresponding numeral, the numeral is embossed so that it is effectively displayed. In this instance, "Auto 1" or "8" (F-number) is omitted in its illustration.

Figure 8:
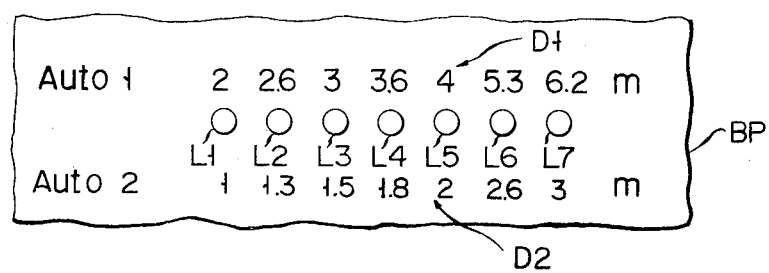
FIG. 8 illustrates a third embodiment of an exposure condition displaying section of an electronic flash apparatus according to the invention.

Turning now to FIG. 8, there is shown a third embodiment of the exposure condition displaying section in which a couple of F-numbers "4" (Auto 1) and "8" (Auto 2) each for a specified film sensitivity are used in association with a single group of light emission elements L1 to L7. In the figure, the first group of distance values 2 to 6.2 for Auto 1 is denoted as D1 and the second group of distance values 1 to 3 for Auto 2 is denoted as D2. This form of the displaying section may enable an operator to select a proper photographable distance for either desired F-number.

Figure 9A:
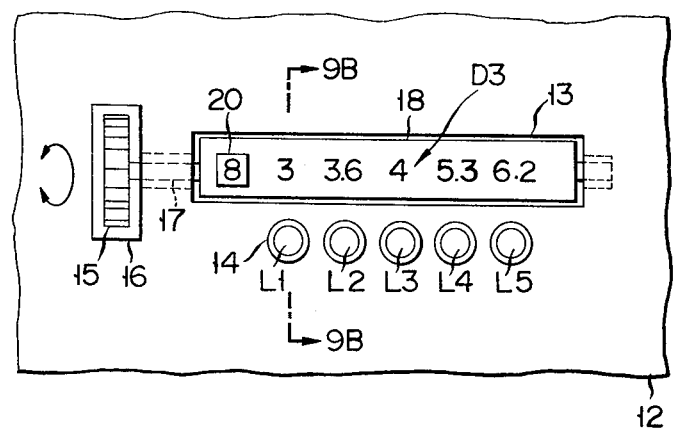
FIGS. 9A and 9B illustrate a fourth embodiment of an exposure condition displaying section of an electronic flash apparatus according to the invention.
Figure 9B:
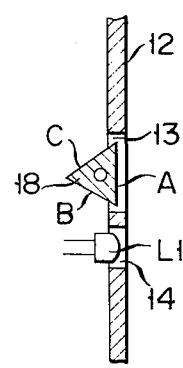

FIGS. 9A and 9B illustrate a fourth embodiment of the exposure condition displaying section which can display three groups of photographable distances for three F-numbers (first to third F-numbers). As shown, this example employs a rotatable member 18 having three faces A, B and C connected at their respective edges to form a triangle shape in cross section. The rotatable member 18 is further provided at one end with a knob 15 for manually rotating the member 18 through its shaft 17. Three groups D3, D4 and D5 of photographable distance corresponding to three F-numbers Auto 1 (or "8"), Auto 2 and Auto 3 are marked on the faces A, B and C of the rotatable number 18, respectively. A housing plate 12 of the exposure condition displaying section has three kinds of openings 13, 14 and 16. The opening 13 is a horizontally elongated rectangular opening, as viewed in the drawing, formed as a window to see the marked numbers representing an F-number and its related photographable distances on each face A, B and C. The vertically elongated opening 16 accepts the knob 15 so as to permit it to manually be rotatable from the outside of the displaying section. The openings 14 for accepting light emission elements L1 to L7 are arranged in a line with intervals in order that, when a light emission element accepted in one of the openings 14 is energized to light it displays its associated distance. The photographable distance group D3 and a corresponding F-number "8" (corresponding to a specified film sensitivity 1) on face A are typically illustrated in FIG. 9A. Accordingly, in this case, if the element L1 is energized to light, it indicates that an object located within 3 (m) is properly photographed with the F-number "8".

When the exposure condition displaying section of this instance is applied to the flash apparatus with the automatic light amount controller as shown in FIG. 3, the controller must have three integrating capacitors C1 to C3 because of the use of three F-numbers. In this case, those capacitors C1 to C3 must be changed in step with the changing of the faces of the rotatable member 18 through manual rotation of the knob 15. In this example, if the number of faces of the rotatable member 18 is increased, more photographable distance groups and F-numbers may be displayed by merely rotating the knob. Thus the preparation of photographing is made speedy and simple.

Figure 10:
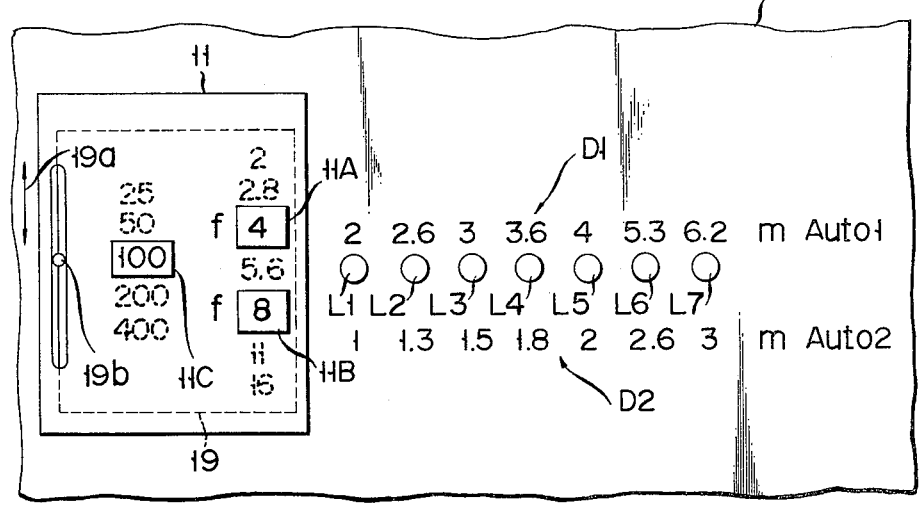
FIG. 10 illustrates a fifth embodiment of an exposure condition displaying section of an electronic flash apparatus according to the invention.

Turing now to FIG. 10, there is shown a fifth embodiment of the exposure condition displaying section according to the invention. This example can display selectively one of the film sensitivities and a plurality of F-numbers (two in this example) corresponding to the selected film sensitivity as well as the photographable distance group for each selected F-number. In the figure, a series of light emission elements L1 to L7 are arranged with associated photographable distance lines; the upper photographable distance group D1 corresponds to "Auto 1" and the lower photographable distance group D2 corresponds to "Auto 2". The distance group D1 corresponds to the F-number "4" when the film sensitivity is "100" and the distance group D2 corresponds to the F-number "8" when the film sensitivity is "100". In this example of the displaying section, a semitransparent plate 11 having F-number display windows 11A and 11B and a film sensitivity display window 11C is provided. The window 11A corresponds to the distance group D1 and the window 11B to the group D2. A movable plate 19 with a knob 19b is slidably sandwiched between the fixed semitransparent plate 11 and the board 12. The movable plate 19 is manually slidable in the direction of an arrow 19a by moving the knob 19b up and down. F-numbers 2 to 16 are marked on the right side of the movable plate 19 and film sensitivities 25 to 400 on the left side of the same. Accordingly, when the sensitivity "100" is displayed in the window 11C, the F-number "4" appears in the window 11A and another F-number "8" in the window 11B. When a film of ASA "100" is used, the F-numbers "4" and "8" are displayed. Accordingly, if the camera user selects the F-number "4", a good quality picture is taken by merely releasing the shutter after checking the photographable distance in the group D1 indicated by the light emission element energized. When the film of ASA "200" is used, the film sensitivity "200" is displayed in the window 11C. Accordingly, the window 11A displays the F-number "5.6" and the window 11B the F-number "11". In this case, the distance group D1 may be used for the F-number "5.6" and the distance group D2 may be used for the F-number "11". The example shown in FIG. 10 may display a plurality of F-numbers and the associated photographable distance group in relation to a selected specific film sensitivity, by merely sliding the movable plate 19.

A sixth embodiment of the exposure condition displaying section will be described with reference to FIGS. 11A and 11B. The embodiment may display three F-numbers for a selected film sensitivity, with a single photographable distance group. A disc 22 is coaxially fixed on a base plate 21. A first rotatable disc 23 is rotated about the axis of the disc 22 with the inner peripharal part thereof disposed between the fixed disc 22 and the base plate 21, as well illustrated in FIG. 11B. A second rotatable disc 24 is rotated about the axis of the fixed disc 22, in contact with the upper surface of the fixed disc 22. A shaft 25 is fixed at one end to the second rotatable disc 24 and is rotatably fitted in center holes of the fixed disc 22 and the base plate 21, passing therethrough. A movable contact 26 of a switch S shown in FIG. 12 is fixed to the other end of the shaft 25. The movable contact 26, when the shaft 25 is rotated, comes in contact with one of fixed contacts 27 of the switch S. A series of film sensitivities "25" to "800" are marked on a part of the peripheral portion of the first rotatable disc 23. There groups of F-number 29A, 29B and 29C are marked with a predetermined distance therebetween on the peripheral portion of the first rotatable disc 23 under the peripheral portion of the fixed disc 22 where three windows 30A, 30B and 30C are correspondingly formed so that each permits one of the F-numbers of each group 29A to 29C to be seen from the outside when it moves right under the corresponding window. For example, when the film sensitivity is "100" as shown, the F-numbers "4", "8" and "16" are seen through the windows 30A, 30B and 30C, respectively. Further, three indicators 31A, 31B and 31C which are colored green, yellow and blue respectively, for example, are disposed for indicating the F-number appearing through the windows 30A, 30B and 30C on the more radially inner side of the fixed disc 22. A film sensitivity indicator index 32 is provided on a part of the periphery of the fixed disc 22, e.g. between the windows 30B and 30C. The second rotatable disc 24 is provided at the peripheral edge with a F-number indicator index 33. A series of photographable distance values, for example, 0.7 to 6.2 (m), are marked with fixed intervals on a part of the peripheral portion of the second disc 24. A series of light emission elements L1 to L7 are disposed with fixed intervals on the fixed disc 22 along the second rotatable disc 24. The schematic relation among the fixed contacts 27 and the movable contact 26 is illustrated in FIG. 12 of which the circuit corresponds to that shown in FIG. 4 having an additional capacitor C3.

The operation of the exposure condition displaying section shown in FIGS. 11A and 11B will be described. The first rotatable plate 23 is first rotated to make the indicator 32 indicate one of the film sensitivities "25" to "800" in accordance with the film used. In FIG. 11A, the film sensitivity indicator 32 indicates "100". At this time, the F-numbers are displayed at the respective windows 30A to 30C. Then, the second rotatable disc 24 is rotated to set the F-number indicator 33 to 31B (an F-number indicating when the automatic light amount control device is used). As a result, the photographable distances 1.5 to 4 (m), which provide a proper exposure under a condition that the film sensitivity is ASA "100" and the F-number is "8", are disposed confronting the light emission elements L1 to L7, respectively.

When the film sensitivity, the F-number and the photographable distance are once set as mentioned above, as the capacitor 3 (FIG. 3) is progressively charged, the light emission elements L1 to L7 are sequentially lit. Accordingly, a camera user can know the photographable distance with proper exposure. With rotation of the second rotatable disc 24, the integrator capacitors C1 to C3 in FIG. 12 are correspondingly switched to provide a light emission amount in accordance with the F-number selected.

When another film with different sensitivity is used, the first rotatable disc 23 is rotated to set the indicator 32 to a desired value of the film sensitivity indicator 28. As a result, the corresponding F-numbers appear in the openings 30A to 30C, respectively. Similarly, when the F-number is changed, the second rotatable disc 24 is rotated to set the indicator 33 to 31A or 31C. In this embodiment of the exposure condition displaying section, the film sensitivity and the corresponding F-number may simply be set and at the same time the automatic light amount controller may be set corresponding to the set F-number.

FIG. 13 shows another embodiment of the drive mean for driving the light emission elements L1 to L7. In this embodiment, operational amplifiers OP1 to OP7 with differential functions are used for controlling the unit discriminating circuits A1 to A7, respectively. A Zener diode ZD1 is used to set the minimum voltage permitting the light emission element L1 to emit light. A DC power source P is used to energize the light emission diodes. Resistors R1 to R7 are used to provide different constant voltages to the input terminals of the operational amplifiers OP1 to OP7. Resistors RL1 to RL7 are serve as loads of the respective light emission diodes L1 to L7. Resistors RA to RC set voltages applied to the input terminals of the operational amplifiers which are different from those derived from the resistors R1 to R7. ZD2 is a Zener diode for providing a stabilized voltage.

In this circuit construction, when the charged voltage across the capacitor 3 is increased to reach a given voltage, the operational amplifier OP1 first produces an output signal to energize the light emission element L1. As the charged voltage further increases to a next predetermined voltage, the light emission element L2 is turned on to emit light. In this same manner, the remaining light emission elements L3 to L7 are successively turned on as the charged voltage increases.

FIG. 14 shows still another embodiment of the light emission element drive circuit according to the invention. In this figure, transistors TR1 to TR7 are used to drive the light emission elements L1 to L7, respectively. Resistors R31 to R38 provides base voltages for the respective transistors TR1 to TR7. Diodes D1, D2 . . . are used to stop the light emission of the first light emission diode when the second light emission diode adjacent to the first one is energized.

In FIG. 14, fixed voltages are constantly applied to the emitters of the transistors TR1 to TR7. Under this condition, as the charged voltage of the capacitor 3 increases, the base voltage also rises. When the charged voltage increases to exceed the voltage defined by the Zener diode ZD1, the transistor TR1 is made conductive to energize the light emission element L1 to emit light. Further increase of the charged voltage of the capacitor 3 makes the transistor TR2 conductive to energize the light emission element L2. At this time, the diode D1 provides a path connecting the anode of the light emission element L1 to the negative terminal of the power source P, through the transistor TR2. As a result, the voltage applied to the anode of the light emission element L1 is decreased so that the light emission diode L1 is de-energized. Accordingly, only one light emission element is energized at one time to ensure indication of the corresponding photographable distance. The light emission of the single element makes the indication distinctive.

The Zener diode ZD1 shown in FIG. 13 or 14 may be replaced by a series circuit having a neon lamp and a resistor. In an alternative, two light colors of the light emission element may be used in a manner that a light emission element is energized to emit light of one color when a camera is not ready for photograph but it is energized to radiate the light of the other color when the camera is ready for photograph.

What is claimed is:

1. In an electronic flash apparatus for a camera having a main discharge capacitor, means for charging the main discharge capacitor, a flash discharge tube which is connected in parallel with the main discharge capacitor and is made to radiate light through the discharge of a charge stored in the main discharge capacitor, and a display means for displaying exposure conditions, the improvement wherein said exposure condition displaying means comprises:
    a display portion for displaying an F-number corresponding to a film sensitivity;
    a portion for displaying a plurality of photographable distances corresponding to the F-number and the charged voltage across said capacitor; and
    charged voltage discriminating means which are provided corresponding to the respective photographable distances within a range including at least a part of which said photographable distance display portion and includes a plurality of light emission elements which are stepwisely energized as the charged voltage across said capacitor increases.

2. An electronic flash apparatus according to claim 1, wherein said exposure condition displaying means further includes a display portion for displaying a film sensitivity.

3. An electronic flash apparatus according to claim 1 or 2, wherein said light emission elements, respectively, are disposed so as to be under said photographable distance display portion whereby photographable distance values corresponding to said light emission elements energized are illuminated by said energized light emission element.

4. An electronic flash apparatus according to claim 1 or 2, wherein said exposure condition displaying means includes first and second distance display portions, a first F-number display portion corresponding to said first distance display portion, and a second F-number display portion corresponding to said second distance display portion.

5. An electronic flash apparatus according to claim 1, wherein said exposure condition displaying means comprises a first rectangular opening formed in the housing wall of said displaying means; a plurality of openings formed therein which are arranged with given intervals in the longitudinal direction of said first opening; a rotatable member which is provided within said first opening and is rotated in the direction normal to the longitudinal direction of said first opening; and means for rotating said rotatable member; wherein said light emission elements are arranged within said second openings, respectively, and said rotatable member includes a plurality of display surfaces each having a F-number display portion and a corresponding photographable distance display portion, a desired display surface being set to correspond to said light emission element group.

6. An electronic flash apparatus according to claim 2, wherein said photographable distance display portion is comprised of a plurality of units each having distance values corresponding to said light emission elements; the film sensitivities and the F-numbers are marked on a plate member which is slidable in the direction normal to the arrangement of the distance values; and a desired film sensitivity corresponding to said distance display units and the F-numbers corresponding to said film sensitivity are displayed through a film sensitivity display window and a plurality of F-number display windows of a plate member fixedly provided above said slidable plate, respectively.

7. An electronic flash apparatus according to claim 2, wherein said film sensitivity display portion and said photographable distance display portion are each comprised of a single unit and said F-number display portion is comprised of a pulurality of portions.

8. An electronic flash apparatus according to claim 2, wherein said exposure condition displaying means is comprised of a first rotatable disc which is fixed to one end of a shaft and is provided at the peripheral portion with an indicator for indicating the F-numbers; a second rotatable disc rotated about the shaft; and a fixed disc which rotatably supports the shaft and is provided at the periphery with an indicator for indicating a film sensitivity, and of which the upper surface partially confronts the lower surface of said first rotatable disc and of which the peripheral portion is partially disposed above said second rotatable disc; wherein said photographable distance values are displayed on the peripheral portion of said first rotatable disc; said light emission elements are fixedly disposed on said fixed disc so as to correspond to at least a part of the distance values marked on said first rotatable disc; said film sensitivities are marked on the periphery of said second rotatable disc; a plurality of groups of said F-numbers are coaxially marked on said second rotatable disc; and said fixed disc is provided with the same number of F-number display windows as that of groups of said F-numbers; whereby a film sensitivity is designated by said indicator by rotating said second rotary disc; a desired F-number is designated by setting said indicator of said first rotatable disc to one of the F-numbers displayed through said F-number display windows of said fixed disc; and photographable distances corresponding to the film sensitivity designated and the F-number displayed are made to correspond to said light emission elements.

9. An electronic flash apparatus according to claim 8, wherein said exposure condition displaying means further includes switch means having fixed contacts which are disposed around said shaft and under said fixed disc, and of which the number is the same as that of said F-number display windows, and a movable contact fixed to the other end of said shaft, and said switch means is used for controlling an automatic light amount controlling means used in said electronic flash apparatus.

10. An electronic flash apparatus according to claim 1 or 2, wherein said electronic flash apparatus is coupled with said main discharge capacitor and a flash discharge tube, and further comprised of an automatic light amount control means for controlling an amount light radiated from said flash discharge tube in accordance with an F-number.

11. An electronic flash apparatus according to claim 1 or 2, wherein said charged voltage discriminating means includes a plurality of unit discriminating circuit connected in parallel with said charging means; said unit discriminating circuit includes a series circuit of a semiconductor switching means having a control electrode and a light emission element, and a control signal supply circuit for providing a control signal to said switching means; said control signal supply circuit including a voltage dividing circuit for sequentially rendering conductive said semiconductor switching means at different timings as the charged voltage across said main discharge capacitor rises.

12. An electronic flash apparatus according to claim 11, wherein said semiconductor switching means is composed of a transistor.

13. An electronic flash apparatus according to claim 11, wherein said light emitting element is composed of a light emitting diode.

14. An electronic flash apparatus according to claim 1 or 2, wherein said charged voltage discriminating means includes a plurality of unit discriminating circuits coupled with said charging means having a first power source and a second power source; said unit discriminating circuit includes a differentially operational amplifier circuit and said light emission element connected to the output terminal of said operational amplifier circuit; said second power source supplies different DC voltages to one of the input terminals of said operational amplifiers; a DC voltage corresponding to a charged voltage across said capacitor is supplied commonly to the other input terminals of said operational amplifiers; whereby said light emission elements are sequentially energized to emit light as the charged voltage across said capacitor increases.

15. An electronic flash apparatus according to claim 14, wherein said second power source includes a voltage stabilizing means.

16. An electronic flash apparatus according to claim 14, wherein said light emitting element is composed of a light emitting diode.

17. An electronic flash apparatus according to claim 1 or 2, wherein said charged voltage discriminating means includes a plurality of unit discriminating circuits coupled with said charging means having a first power source and a second power source;
   said unit discriminating circuit includes a series circuit connected in series with said second power source and having a semiconductor switching element with a control electrode connected in series with said light emission element, and a diode which is connected at the anode to the positive electrode of said light emission element energized at a first timing and at the cathode to the negative electrode of another light emission element energized at a second timing following the first timing; and the control electrodes of said switching means are connected to the different voltage dividing points of a voltage dividing circuit for voltage dividing the charged voltage across said main discharge capacitor, whereby the light emission of the light emission element energized at said first timing is stopped when the light emission element adjacent thereto is energized at said second timing.

18. An electronic flash apparatus according to claim 17, wherein the voltage of said second power source is stabilized.

19. An electronic flash apparatus according to claim 17, wherein said semiconductor switching means is composed of a transistor.

20. An electronic flash apparatus according to claim 17, wherein said light emission element is a light emission diode.

* * * * *